United States Patent [19]

Saito et al.

[11] Patent Number: 4,861,441
[45] Date of Patent: Aug. 29, 1989

[54] METHOD OF MAKING A BLACK SURFACE TREATED STEEL SHEET

[75] Inventors: Katushi Saito; Yoshio Shindou; Toshimichi Murata; Fumio Yamazaki; Takashi Shimazu, all of Kimitsu, Japan

[73] Assignee: Nippon Steel Corporation, Tokyo, Japan

[21] Appl. No.: 84,727

[22] Filed: Aug. 13, 1987

[30] Foreign Application Priority Data

| Aug. 18, 1986 [JP] | Japan | 61-192613 |
| Sep. 6, 1986 [JP] | Japan | 61-208863 |
| Dec. 16, 1986 [JP] | Japan | 61-299200 |

[51] Int. Cl.$^4$ .................................................. C25D 5/26
[52] U.S. Cl. .................................. 204/38.7; 204/44.2; 428/623
[58] Field of Search ............... 428/623, 632, 633, 659; 204/38.7, 44.2

[56] References Cited

U.S. PATENT DOCUMENTS

| 4,313,802 | 2/1982 | Shibuya et al. | 204/44.2 |
| 4,629,659 | 12/1986 | Kyono et al. | 428/659 |
| 4,707,415 | 11/1987 | Ikeda et al. | 428/632 |

FOREIGN PATENT DOCUMENTS

| 381728 | 9/1986 | Austria . | |
| 101793 | 3/1984 | European Pat. Off. | 204/44.2 |
| 3028587 | 3/1982 | Fed. Rep. of Germany . | |
| 3329745 | 9/1984 | Fed. Rep. of Germany . | |
| 52-45544 | 4/1977 | Japan . | |
| 52-65139 | 5/1977 | Japan . | |
| 58-151490 | 9/1983 | Japan . | |
| 58-151491 | 9/1983 | Japan . | |
| 60-121265 | 6/1985 | Japan . | |
| 60-20996 | 10/1985 | Japan . | |
| 30696 | 2/1986 | Japan | 204/44.2 |
| 143582 | 7/1986 | Japan | 428/659 |

OTHER PUBLICATIONS

Jitsumu Hyomen Gijutsu, vol. 32, No. 10, p. 541.

Primary Examiner—L. Dewayne Rutledge
Assistant Examiner—George Wyszomierski
Attorney, Agent, or Firm—Pollock, Vande Sande & Priddy

[57] ABSTRACT

A colored zinc composite-plated steel sheet which comprises a steel sheet or a plated steel sheet, a colored composite-plating film comprising zinc and an oxide of a coloring metal such as nickel, cobalt, iron, chromium, tin or copper and provided on the steel sheet at a coverage of 0.1–5 g/m$^2$ and a transparent guard coat of 3 μm or less thick provided on the film is obtained by carrying out electrolysis in an acidic aqueous solution containing zinc ion, a coloring metal ion and nitrate ion, nitrite ion, perchlorate ion, chlorate ion, condensed phosphate ion and having a pH of 1–4 using the steel sheet or plated steel sheet as a cathode at a current density of 5–100 A/dm$^2$ and a current quantity of 20–200 coulomb/dm$^2$.

16 Claims, 2 Drawing Sheets

X 3500

X 3500

METHOD OF MAKING A BLACK SURFACE TREATED STEEL SHEET

BACKGROUND OF THE INVENTION

1. Field of the Invention

This invention relates to a colored steel sheet, especially a black sheet, used for members to be decorated and a method for making same.

2. Description of the Prior Art

Development for surface treated steel sheets of low cost and high performance has been earnestly demanded in the fields of rust proofing steel sheets for cars, steel sheets, household furnishings and building materials. These demanded standards have been yearly shifted to further lower cost and improve quality, and steel makers have developed new techniques and new products to meet the requirements of users. Recently, it has been attempted to provide precoated steel sheets instead of the conventional surface treated steel sheets which are subjected to working and then pretreatment and coating, whereby the pretreatment and coating which have been made by users can be omitted and products of high quality can be obtained at low cost. For meeting these requirements, hitherto precoated steel sheets applied with a coating composition have been used, but now demands for inorganic colored steel sheets have become greater for complete cost-down, sophisticated appearance and for improving weldability and removing damages caused by handling.

For color tone, need for blackish colors is strong and besides the above requirements, the following are required: namely, fingerprints are not left thereon; high workability, chemical resistance and corrosion resistance.

The conventional black treating method is generally applied to stainless steel, steel sheets, and copper, but since zinc plated steel sheets meet the object of this invention from the point of cost and corrosion resistance, conventional technique for blackening thereof will be explained below.

As known blackening methods of zinc or zinc alloy plated steel sheets, there are the methods of Japanese Patent KOKAI (Laid-Open) No. 45544/77 which comprises treating the sheets in an aqueous chromate solution containing silver ion (black chromate), the method disclosed in Jitsumu Hyomen Gijutsu, Vol. 32, No. 10, pages 541-542, Tables 3 and 5, and the like. According to these methods, silver oxide is coprecipitated together with a chromate film to obtain black surface. Japanese Patent KOKAI (Laid-Open) No. 65139/77 discloses a method which forms a black appearance by production of a sulfide. Japanese Patent KOKAI (Laid-Open) Nos. 151490/83 and 151491/83 disclose blackening by anode electrolysis treatment. According to the former, oxide of Ni, Co or Mo is produced by anodization in an alloy plating bath of $Ni^{2+}$, $Co^{2+}$ or $Mo^{2+}$ and $Zn^{2+}$ and according to the latter, the oxide is produced by anodization of Ni, Co or Mo and Zn alloy plated steel in an aqueous ammonium sulfate solution. Furthermore, Japanese Patent KOKAI (Laid-Open) No. 121275/85 discloses a method for obtaining black appearance by chemically dissolving an Ni-Zn alloy plated steel sheet with an aqueous solution of nitric acid or a chlorate.

Moreover, Japanese Patent KOKAI (Laid-Open) No. 200996/85 discloses a method for blackening by cathodic electrolysis in an alloy plating bath containing $Zn^{2+}$ and $Ni^{2+}$ to obtain a steel sheet plated with a zinc alloy containing at least 15% of Ni.

The above mentioned conventional methods are not necessarily the best ones and suffer from many problems. For example, the method using silver ion is high in cost and besides has a difficulty in productivity. The anodization method has the problem that the plated metal of the base is greatly dissolved and so the metals to be plated are limited and besides once plated metals may be redissolved.

The method of Japanese Patent KOKAI (Laid-Open) No. 200996/85 has also the problems in production that since the resulting film is an Ni-Zn alloy black plating film, there are limitations in current density and bath temperature for attaining black and substrate plating is limited to zinc or zinc alloy plating.

SUMMARY OF THE INVENTION

The object of this invention is to provide a black surface treated steel sheet free from the above problems and produced by a black treating method which can be carried out at high speed in a short time and has no limitations in the substrate metals.

According to this invention, there is provided a colored zinc composite-plated steel sheet which has thereon a 0.1-5 g/m$^2$ of a colored composite-plating film mainly composed of metallic zinc or zinc alloy and a coloring metal oxide or hydrated oxide obtained by electrolysis, with a steel sheet or a plated steel sheet as a cathode in an acidic aqueous solution mainly composed of $Zn^{2+}$ ion, and a coloring metal ion represented by $Me^{n+}$, and a strongly oxidizing ion represented by $OX^-$, and a chemical treatment film, and a transparent guard coat film of 3 μm or less in thickness.

According to this invention, there is further provided a method for making a colored zinc composite-plated steel sheet which comprises carrying out electrolysis with a steel sheet or a plated steel sheet as a cathode in an acidic aqueous solution mainly composed of $Zn^{2+}$, and a coloring metal ion represented by $Me^{n+}$, and a strongly oxidizing ion represented by $OX^-$ at a current density of 5-100 A/dm$^2$, and a current amount of 5-200 coulomb/dm$^2$, then washing the treated sheet and thereafter applying a guard coat.

BRIEF DESCRIPTION OF THE DRAWINGS

FIG. 3 shows an example using a bath containing condensed phosphoric acid and FIG. 4 is one without condensed phosphoric acid.

DETAILED DESCRIPTION OF PREFERRED EMBODIMENT

This invention is based on the technique of cathodic composite deposition composed of black oxides or hydrated oxides of Zn and Me and metallic zinc or zinc alloy on a metal surface. Hitherto, poor plating has been observed in blackish color plating such as zinc plating due to the phenomena such as discoloration caused by coarse crystal of plated metals. The quality of the plating is nonuniform and utterly unsatisfactory and this technique has never been practically employed. This invention has succeeded in producing a uniform blackish film of superior adhesiveness by interaction of an alloy plating bath and an oxidizing ion.

The most important point of this invention is that conditions for forming colored film and quality of the film can be markedly improved by adding a strongly oxidizing water-soluble anion to a zinc alloy plating bath containing a metal ion which forms a black oxide or hydrated oxide. This invention will be explained in detail below.

Composition of the color surface treated steel sheet of this invention and mechanism of formation of the film will be explained.

In the treating bath there are present zinc ion ($Zn^{2+}$), a blackening metal ion ($Me^{n+}$), a strongly oxidizing ion ($OX^-$) and ($H^+$).

Figure 1:
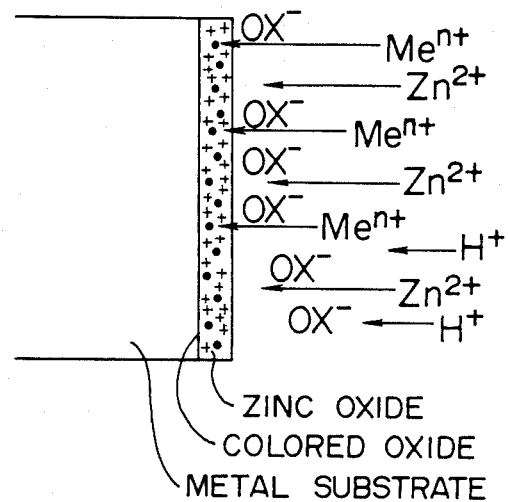
FIG. 1 is a diagram which shows coloring mechanism and construction of film according to this invention.

As shown in FIG. 1, zinc and zinc alloy are deposited on a cathode due to reduction of $Zn^{2+}$ and $Me^{n+}$. At the same time, the metals are oxidized with $OX^-$ in the plating bath simultaneously with the deposition and zinc oxide (mark +) and MeO (mark ) are deposited. These oxides also include hydrated oxides. Generation of hydrogen is prevented by deposition of zinc high in hydrogen overvoltage.

As $Me^{N+}$, there may be used $Ni^{2+}$, $Co^{2+}$, $Fe^{2+}$, $Fe^{3+}$, $Cr^{3+}$, $Sn^{2+}$ and $Cu^{2+}$ alone or in combination which cause coloration upon oxidation with $OX^+$. $OX^+$ is a strongly oxidizing anion and is at least one of $NO_3$, $NO_2$, $ClO_4^-$ and $ClO_3^-$. In the bath of this invention, condensed phosphoric acid ion, for example, compounds represented by $P_2O_7^{2-}$, $P_2O_4^{4-}$, $P_3O_{10}^{5-}$ and $P_6O_{19}^{8-}$, $Cr^{3+}$ and a brightener (coating improver) may also be used to improve quality of the film.

In this invention, zinc acts as a vehicle for colored composite-plated film. If the composite ratio of the oxide and zinc is improper, the film is apt to become susceptible to the subsequent chemical treatment and guard coat application, resulting in powdering in the surface layer. A colored film good in adhesion properties can be produced by selecting a proper $Me^{n+}/Zn^{2+}$ ratio and suitable oxidizing ability pH of bath and current density.

When a coating improver is added to the plating bath, the resulting composite-plating film becomes dense and is improved in its quality.

FIG. 2 is a diagrammatic sectional view of the color surface treated steel sheet. S indicates a metallic substrate as a base which may be a thin steel sheet, stainless steel sheet, and various plated steel sheets such as, for example, a zinc or zinc alloy plated steel sheet, an aluminum or aluminum alloy plated steel sheet, a tin plated steel sheet and a lead plated steel sheet, etc. B indicates a colored zinc composite plating layer, G indicates a guard coat, Gc indicates a chemical treatment film in a part of the guard coat, for example, a chromate film and Z indicates a plating layer.

Figure 2A:
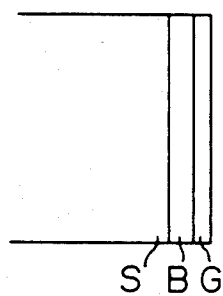
FIGS. 2(a), 2(b), 2(c) and 2(d) are diagrammatic sectional views which show construction of the colored zinc composite-plated steel sheet of this invention.
Figure 2B:
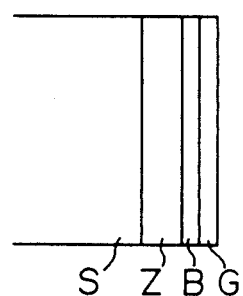
Figure 2C:
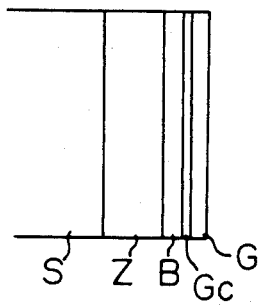
Figure 2D:
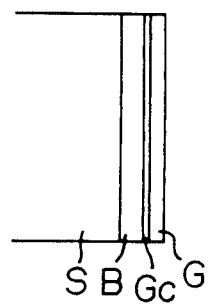

FIG. 2(a) and shows an example of a colored steel sheet with a guard coat, FIG. 2(b) an example of coloration of a plated steel sheet, FIG. 2(c) shows an example of carrying out a chromate treatment after coloration (B), followed by application of a guard coat, and FIG. 2(d) shows an example of a colored steel sheet having chromate and guard coating on unplated steel sheet.

The colored film of this invention is a composite film of a metal and a coloring compound (oxide or hydrated oxide), and degree of coloration depends on the deposition amount of the oxide or hydrated oxide. The amount of at least 0.1 $g/m^2$ is necessary for obtaining a black appearance. A deposition amount of at least 1.0 $g/m^2$ is desirable for blackish appearance.

When the composite plating film is too thick, a phenomenon called powdering occurs and thus the thickness is suitably 5 $g/m^2$ or less.

The chemical treatment may be effected immediately after formation of a black film by electrolysis. The chemical treatment includes the chromate application method comprising application of a chromate solution mainly composed of water-soluble chromium compound and then drying without water washing, the chromate etching method comprising reaction with a chromate solution and then water washing, the electrolytic chromate method comprising electrolysis in a chromate solution and phosphate treatment with solution composed of phosphoric acid or condensed phosphoric acid compound. The chromate treatment tends to increase blackiness and is advantageous for obtaining black appearance.

When a solution containing condensed phosphate ion is used as a coating improver, the resulting black film comprises a metal oxide and phosphates. The black film is in the form of smooth film having fine irregularities and according to this film black appearance of 20 or less in terms of value L (brightness: JIS Z 8370) may be very easily obtained.

Figure 3:
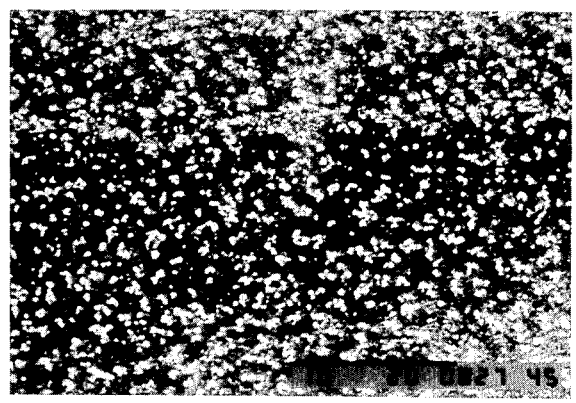
FIG. 3 and FIG. 4 are microphotographs of the surface of the black surface treated steel sheet of this invention.
Figure 4:
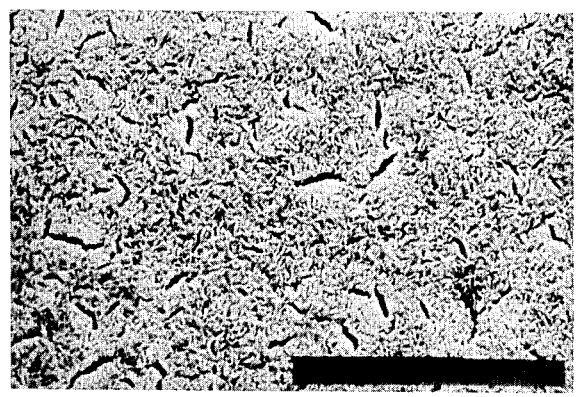

FIG. 3 is a scanning electron micrograph (SEM) of the surface of a black surface treated steel sheet obtained by subjecting the surface of a steel sheet with zinc at a thickness of 3 $\mu m$ and thereafter to cathodic electrolysis treatment in an aqueous solution of $ZnSO_4$ $ZnSO_4 \cdot 7H_2O/NiSO_4 \cdot 7H_2O/NaNO_3/Na_5P_3O_{10} = 200/100/10/16$ g/l having a pH=1.8 at a current density of 10 $A/dm^2$ and at a current quantity of 50 coulomb/$dm^2$, and then to washing with water. FIG. 4 is a scanning electron micrograph of a black surface treated steel sheet obtained under the same conditions as above, except that $Na_5P_3O_{10}$ was not added to the bath. It is clear that the surface of the sheet obtained without $Na_5P_3O_{10}$ has a rod-like rough structure while that of the sheet obtained with addition of $Na_5P_3O_{10}$ has a fine dense structure. However, rod-like rough structures can also be improved by higher current density and additives such as $Cr^{3+}$, and brightener.

Composition of the black film comprises oxides or hydrated oxides of Zn and at least one of Me (Fe, Co, Ni and Cr, etc.) and metallic zinc and it may include a phosphate or brightener. The phosphate is an amorphous condensed phosphate and is different from the conventional crystalline phosphate film. Sufficient blackness (20 or less in value L) can be obtained by depositing the film in an amount of at least 0.1 $g/m^2$ for the common zinc electroplated steel sheet, Ni-Zn alloy electroplated steel sheet and cold-rolled steel sheet, though it depends on the surface state of the metal to be treated. When the deposition amount is too large, the film suffers from powdering phenomenon, resulting in poor adhesion. Practical upper limit of the deposition amount is 5 $g/m^2$. In case of black color, the most preferred is 1.0–3.0 $g/m^2$.

The colored zinc composite-plated steel sheet of this invention has a guard coat on the colored composite-platin film. This guard coat is provided for improvement of quality. For example, application of the guard coat affords improvement in uniformity of appearance and increase in degree of coloration.

Steel sheets having appearances of from semigloss to gloss can be obtained depending on the kind and thickness of the guard coat. Further, scratch resistance is improved by the guard coat. The guard coat is especially effective for protection against pressing, handling and mars caused by striking. Corrosion resistance is especially highly improved.

The guard coat of this invention includes (1) chemical coating film such as chromate film, phosphate film, chelate film and the like which are formed with chemical reaction, (2) resin film, (3) inorganic polymer film, (4) composite film of resin and inorganic polymer, (5) oils, fats, waxes, etc. and may comprise one or a plurality of these films.

Thickness of the guard coat must be determined so as not to damage appearance and weldability and is at most 3 μm, and preferably 1.5 μm or less in total thickness. Resin coating weight of the guard coat is 3 g/m² or less, preferably 1.5 g/m² or less.

The resin film (organic polymer) is a film formed by coating a water-soluble, water-dispersible or solvent soluble organic high molecular weight compound together with a hardener and hardening the coat by baking or by coating composite polymers comprising inorganic and organic compounds and a hardener, if necessary, and hardening the coat by baking. The inorganic and organic compounds include inorganic compounds, e.g., chromium compounds, oxides such as silica, titania, alumina and zirconia, silicate minerals such as mica and talc, phosphates and borates, organic compounds such as fatty acid soaps, carbon, fatty acid esters and plastic particles and organometallic compounds such as silane coupling agents and titanium coupling agents.

The inorganic polymers include silicate compounds and sols such as sodium silicate and lithium silicate, condensed phosphoric acid polymers, polyphosphates, and zirconic acid polymers. Oil and fat waxes may be known polymers.

In the colored zinc composite-plated steel sheets of this invention, since the colored composite-plating film and the guard coat are thin in thickness, there can be obtained appearance and quality utilizing the surface state of substrate metal such as gloss and roughness. For example, semigloss appearance can be obtained by employing an average surface roughness of substrate metal of 1.5 μm or more. Gloss appearance can be obtained by average surface roughness of substrate metal of 1 μm or less.

Method for production of the colored coated steel sheet of this invention is explained below.

Zinc ion plays an important part in the acidic aqueous solution used in this invention. Zinc ion is reduced to zinc, and zinc oxide or hydrated oxide is deposited at cathode, and metallic zinc prevents generation of hydrogen, imparts rust proofness and simultaneously acts as a binder for the film and improves current efficiency and affords uniform appearance.

Concentration of zinc ion as $Zn^{2+}$ may be within the range of 10–100 g/l and is preferably 20–50 g/l.

$Me^{n+}$ in the acidic aqueous solution is at least one selected from the group consisting of $Ni^{2+}$, $Co^{2+}$, $Fe^{2+}$, $Fe^{3+}$, $Cr^{3+}$, $Sn^{2+}$ and $Cu^{2+}$ and addition amount thereof is 10–100 g/l and preferably 20–90 g/l.

The proper ratio of $Me^{n+}/Zn^{2+}$ in solution is between 0.1–8.0. Lower ratio of $Me^{n+}/Zn^{2+}$ gives coarser and more black structure film and higher ratio gives a compact and glossy one.

As a source of supply of $Zn^{2+}$ and $Me^{n+}$, there may be used sulfates, chlorides, phosphates, sulfamates and sulfonates, and as sources of replenishment, there may be used carbonates, oxides, hydroxides, metallic powders, etc.

$OX^-$ is an ion selected from $NO_3^-$, $NO_2^-$, $ClO_4^-$ and $ClO_3^-$ and is supplied as a soluble salt or acid. Concentration of $OX^-$ is suitably 1–50 g/l and most suitably 3–20 g/l as ion. When it is less than 1 g/l, oxide enough to give coloration is not formed and no coloration occurs. When more than 50 g/l, all metals are oxidized to make it difficult to get adherent film, and powdering phenomenon is apt to occur.

$OX^-$ is reduced at cathode electrode, but oxidized at anode electrode. It should be replenished in case of shortage.

Colored deposition can be obtained easily by electrolysis in the solution mainly composed of $Zn^{2+}$, $Me^{n+}$ and $OX^-$. However, to improve quality of deposition, condensed phosphoric acid compounds may be added.

The condensed phosphoric acid compounds are compounds which provide ions where 2 or more P bond, such as $P_2O_5^{4-}$, $P_3O_{10}^{5-}$, $P_4O_{13}^{6-}$ and $P_6O_{19}^{8-}$ for example, sodium salts, potassium salts, calcium salts, magnesium salts, metal salts (Zn, Fe, Co, Ni, Cr). The amount of the condensed phosphoric acid compound to be added is 1–20 g/l.

The condensed phosphoric acid compound used in this invention has an action of smooth finishing of black film deposited. It will be recognized from comparison of FIG. 3 and FIG. 4 that the condensed phosphoric acid has a great effect. The black film becomes smooth and dense by the action of the condensed phosphoric acid compound. Thus, the surface becomes semigloss whereby appearance is improved and besides, adhesion and corrosion resistance are remarkably improved. The condensed phosphoric acid compound has a further action of enhancing the adhesiveness to the guard coat by coexisting as a phosphate in the film.

Besides color element, $Cr^{3+}$ in solution also has ability as improver like condensed phosphoric acid compound. In this case, $Cr^{3+}$ is added in an amount of 0.1–1.0 g/l, preferably 0.1–1 g/l as phosphate, sulfate, chloride, carbonate and chelate compound. When the concentration is less than 0.1 g/l, improving effect is low and when more than 10 g/l, sufficient black color tone cannot be obtained. Films are obtained from aqueous solution containing these ions, they are precipitated as Cr compound with colored film to improve corrosion resistance and adhesion after application of guard coat.

Coloration can be attained at bath temperatures in a wide range, but preferred bath temperature is 30°–60° C.

The colored films obtained by this invention can be improved in qualities, especially gloss, powdering and adhesion to guard coat by using an acidic aqueous solution containing a brightener in addition to $Zn^{2+}$, $Me^{n+}$ and $OX^-$.

As examples of the brightener, mention may be made of water-soluble polymeric compounds, for example, polyamine compounds of cationic quaternary ammonium salts, polyaminesulfone compounds, nonionic polyacrylamide compounds, copolymers of these compounds with anionic compounds and known brighteners such as aldehyde or phenolic compounds and sulfonic acid compounds.

The amount of the brightener depends on the kind of the compounds and it may be added optionally within the range of 10–40000 ppm.

When condensed phosphate ion is used, pH of the aqueous solution is preferably 1.0–4.0. According to this invention, a black surface can be obtained at a pH of a very wide range (0.7–4.0), but the above pH range is preferred considering quality of the resulting black film, e.g., adhesion. When pH is less than 1, hydrogen gas is generated and causes uneven coloration. When more than 4, precipitation is apt to occur. A pH of 1.5–3.0 is preferred considering powdering phenomenon and adhesion to the guard coat.

The bath temperature is preferably 20°–60° C., though coloration is possible in a wide temperature range.

Next, electrolysis conditions will be explained below.

The method of this invention is a very excellent method which can select wide conditions for coloring as compared with the conventional method. Current density is 10–100 A/dm$^2$. When it is less than 10 A/dm$^2$, coloring is difficult. When more than 100 A/dm$^2$, hydrogen gas is generated and there is the high possibility of removal of the formed film. Current density has an influence on the quality of the composite film. The higher current density gives more compact structure with a metal rich layer. The lower current density gives a more coarse structure oxide rich layer. The preferable range of current density which provides the best quality (appearance, adhesion, corrosion resistance) is 20–50 A/dm$^2$. Quantity of current is 20–200 coulomb/dm$^2$. When it is less than 20 coulomb/dm$^2$, coloration is difficult, resulting in uneven appearance. When it is more than 200 coulomb/dm$^2$, removal of the film and pinholes due to generation of hydrogen gas often occurs, also white film is sometimes deposited which causes uneven coloration. When condensed phosphate ion is used, quantity of current is desirably 5–100 coulomb/dm$^2$ for the same reasons.

With reference to flow velocity, both a still bath and/or a bath of high flow velocity may be employed.

The method of this invention has been applied to cold-rolled steel sheet, zinc alloy plated steel sheet, zinc plated steel sheet, gloss zinc plated steel sheet, tin plated steel sheet, etc. Colored film could be formed on all of them and in the case of black film, cold-rolled steel sheet and zinc alloy plated steel sheet were superior in blackness and scratch resistance.

In this invention, if necessary, other compounds may be added to the bath for the following purposes, namely, various supporting salts for enhancing electroconductivity of the solution; borates, phosphates and phthalates as pH buffers; polymers for improving adhesion workability; phosphates, chromic acid, inorganic sol compounds, cationic polymers for rust proofing or enhancing adhesion to guard coat; chelating agents for prevention of precipitation; chlorides and fluorides for imparting smoothness to zinc composite-plating film formed.

Coating of the guard coat can be performed by known methods such as roll coating, squeeze roll coating, spraying, air knife drawing, dipping, electrolysis, electrostatic coating, etc. If necessary, the thus coated guard coat is then heated (hot air, infrared, combustion furnace, electric heat) or hardened with ultraviolet rays.

This invention will be explained by the following examples. Unless otherwise notified, $Zn^{2+}$ and $Me^{n+}$ were made from a sulfate and a sodium salt was used for $OX^-$.

Current density is indicated by DK and expressed by A/dm$^2$. Quantity of current is indicated by Q and expressed by coulomb/dm$^2$. Amount of colored zinc composite-plating deposited is indicated by CW and measured by gravimetric method and expressed by g/m$^2$.

Value L shows brightness and was measured by commercially available differential colorimeter. Value L of 25 or less is necessary in connection with degree of blackness.

Unless otherwise notified, the following chemical treatment and application of guard coat were effected in the examples.

As chromate, a coating type chromate comprising silica and chromic acid (with addition of phosphoric acid according to the purpose) was used in a deposition amount of 20 mg/m$^2$ in terms of Cr. As the guard coat there was used a clear coat of commercially available aqueous olefin acrylic acid emulsion and silica sol. The coat was applied by roll coat method and baked with hot air at a sheet temperature of 120° C. so that a coat of about 1 μm was obtained.

Adhesion was measured by subjecting the sample to flexural working of T-bending (one sheet thickness) of 180° and then to peeling by tape or by Erichsen 10 mm deep drawing and then peeling by tape. The results were evaluated usually and rated as follows:

" "—No peeling occurred.
" • "—A slight peeling occurred.
"Δ"—Tape adhered in the form of dots.
"x"—Complete peeling occurred.

Corrosion resistance was evaluated by continuous salt spray exposure test specified in JIS Z 2371 and the results are shown by the time required for formation of 5% of rust per unit area.

EXAMPLE 1

A cold-rolled steel sheet was subjected to electric zinc plating in a sulfuric acid bath by known method, then washing with water, immediately thereafter the coloring treatment as shown in Table 1, then application with guard coat and baking. The electrolysis treatment was carried out using the sample as a cathode and a lead plate as an anode.

After the coloring treatment, the sample was washed with water and dried with a hot air and then value L was measured by differential colorimeter.

Nos. 1–4 show the data obtained when sodium nitrate was used as $OX^-$ and the ratio $Zn^{2+}$ and $Ni^{2+}$ was changed and indicate that appearances of low value L were obtained with a bath containing $Zn^{2+}$ and $Ni^{2+}$.

Nos. 5–8 show the data obtained when a bath containing $Zn^{2+}$ and $Fe^{2+}$ and current density was changed between 10–100 A/dm$^2$ and indicate that value L somewhat increased at 10 A/dm$^2$ and peeling in the form of dots began to occur at 100 A/dm$^2$. No 9 is an example where a pH of 1.2 was employed and low value L was obtained even at low pH. No. 10 shows an example where $OX^-$ was not contained and only appearance of high value L was obtained.

Nos. 11 and 12 are examples where composite baths were used and low value L was obtained.

Nos. 13–16 show the data obtained when concentrations of $Zn^{2+}$ and $Fe^{2+}$ were changed. When concentration of $Zn^{2+}$ was too low, the film became white and when the ratio of concentration closed to 3, value L became high.

No. 17 shows the data obtained when a composite bath containing $Fe^{2+}$ and $Fe^{3+}$ as $Me^{n+}$ and influence of $Fe^{3+}$ was small.

Nos. 18-20 are examples where $NO_2^-$, $ClO_4^-$, and $ClO_3^-$ were used as $OX^-$ and show that $NO_2^-$ and $ClO_3^{2-}$ which are less in oxidizing action afforded somewhat higher value L than $ClO_4^-$ and $NO_3^-$.

Nos. 21-22 are examples where $Ni^{2+}$ and $Co^{2+}$ were jointly added as $Me^{n+}$ and pH was changed and show that value L was high at around pH=1, resulting in etching phenomenon and uneven coloration.

Nos. 23-28 are examples where concentration of $NO_3^-$ as $OX^-$ was changed and show that the baths containing 50 and 100 g/l of $NO_3^-$ gave high value L and these were critical values and concentrations of $NO_3^-$ of 5, 10 and 20 g/l gave satisfactory value L.

Nos. 29-31 are examples where coulomb amount was changed and show that when current of 25 coulomb was used, value L was somewhat high and when 200 coulomb was used, powdering occurred.

TABLE 1

| No. | | $Zn^{2+}$ | $Me^{n+}$ | $OX^-$ | pH | Bath temp. | Dk | Q | CW | Value L | Adhesion | Corrosion resistance |
|---|---|---|---|---|---|---|---|---|---|---|---|---|
| 1 | Comparative Example | 50 | $Ni^{2+}$ 0 | $NO_3^-$ 10 | 2.0 | 50 | 50 | 50 | 1.0 | 70 | | — |
| 2 | Example of this invention | " | 10 | " | " | " | " | " | " | 1.5 | 25 | | 300 |
| 3 | " | " | 20 | " | " | " | " | " | " | 1.6 | 11 | | " |
| 4 | Comparative Example | 0 | 50 | " | " | " | " | " | " | 0.7 | 60 | x | — |
| 5 | Example of this invention | 50 | $Fe^{2+}$ 30 | " | " | " | " | " | " | 1.6 | 20 | | 300 |
| 6 | " | " | " | " | " | " | 10 | " | " | " | 25 | | " |
| 7 | " | " | " | " | " | " | 75 | " | " | " | 12 | | " |
| 8 | " | " | " | " | " | " | 100 | " | " | " | 12 | Δ | 72 |
| 9 | " | " | " | " | 1.2 | " | 50 | " | " | " | 12 | | 300 |
| 10 | Comparative Example | " | " | — | 2.0 | " | " | " | " | 1.2 | 40 | | — |
| 11 | Example of this invention | " | $Ni^{2+}$ 20 $Co^+$ 2 | $NO_3^-$ 20 | 1.8 | " | " | " | " | 1.5 | 13 | | 300 |
| 12 | Example of this invention | " | $Cr^{3+}$ 5 $Fe^{2+}$ 20 | $NO_3^-$ 20 | 1.8 | 50 | 50 | 50 | 1.5 | 20 | | 300 |
| 13 | " | 50 | $Fe^{2+}$ 10 | " | 1.8 | " | " | " | " | 1.5 | 15 | | 300 |
| 14 | " | " | 20 | " | " | " | " | " | " | 1.6 | 11 | | 300 |
| 15 | " | 20 | 20 | " | " | " | " | " | " | 1.0 | 30 | Δ | 300 |
| 16 | " | 20 | 100 | " | " | " | " | " | " | 0.5 | 40 | | — |
| 17 | Example of this invention | 50 | $Fe^{2+}$ 20 $Fe^{3+}$ 5 | " | " | " | " | " | " | 1.4 | 18 | | 300 |
| 18 | " | 75 | $Fe^{2+}$ 20 | $NO_2^-$ 20 | " | " | " | " | " | 1.0 | 20 | | 200 |
| 19 | " | " | " | $ClO_4^-$ 20 | " | " | " | " | " | 1.5 | 16 | | 168 |
| 20 | " | " | " | $ClO_2^-$ 20 | " | " | " | " | " | 1.0 | 25 | | 168 |
| 21 | " | 75 | $Ni^{2+}$ 45 | $NO_3^-$ 20 | 3.0 | " | " | " | " | 1.5 | 12 | Δ | 300 |
| 22 | " | " | $CO^{2+}$ 2 | " | 1.0 | " | " | " | " | 1.0 | 19 | | 200 |
| 23 | Comparative Example | 75 | $Fe^{2+}$ 30 | $NO_3^-$ 0 | 1.5 | 50 | 60 | 50 | 1.0 | 50 | — | — |
| 24 | Example of this invention | " | " | 5 | " | " | " | " | 1.5 | 19 | | 300 |
| 25 | " | 75 | " | 10 | " | " | " | " | " | 1.5 | 12 | | " |
| 26 | " | " | " | 20 | " | " | " | " | " | 1.5 | 12 | Δ | " |
| 27 | " | " | " | 50 | " | " | " | " | " | 1.2 | 25 | Δ | " |
| 28 | Comparative Example | " | " | 100 | " | " | " | " | " | 1.0 | 30 | Δ | " |
| 29 | Example of this invention | " | $Ni^{2+}$ 25 $Co^{2+}$ 5 | $NO_3^-$ 10 | 1.5 | " | " | 25 | 0.6 | 20 | | 300 |
| 30 | " | " | " | " | " | " | " | 100 | 2.5 | 14 | | 300 |
| 31 | " | " | " | " | " | " | " | 200 | 5.0 | 14 | Δ~ | 300 |

EXAMPLE 2

Electrolysis (50 A/dm² and 50 coulomb/dm²) was effected in an aqueous solution containing 400 g/l of zinc sulfate ($Zn^{2+}$92), 100 g/l of nickel sulfate ($Ni^{2+}$20) and 20 g/l of $NaNO_3$ and having a pH of 1.5 and a bath temperature of 50° C. using a lead sheet as anode and various steel sheets and plated steel sheets as shown in Table 2 as cathode. Then, the thus treated steel sheets were applied with a guard coat in the same manner as in Example 1.

TABLE 2

| No. | | Steel sheet to be treated | C.W | Value L | Adhesion | Corrosion resistance |
|---|---|---|---|---|---|---|
| 32 | Example of this invention | Cold-rolled steel sheet | 1.6 | 11 | | 24 |

TABLE 2-continued

| No. | Steel sheet to be treated | C.W | Value L | Adhesion | Corrosion resistance |
|---|---|---|---|---|---|
| 33 | " Stainless steel sheet | 1.6 | 11 | | — |
| 34 | " Hot dipped zinc plated steel sheet (20μ) | 1.7 | 19 | | 168 |
| 35 | " Molten aluminum plated steel sheet (10μ) | 1.4 | 18 | | 500 |
| 36 | " Zn—Ni alloy electroplated steel sheet | 1.7 | 11 | | 500 |
| 37 | " (Ni 12%) 3μ | | | | |
| 38 | " Zn—Fe alloy eletroplated steel sheet | 1.7 | 11 | | 500 |
| 39 | " (Fe 20%) 3μ | | | | |
| 40 | " Tern plated steel sheet | 1.7 | 11 | | 500 |
| 41 | " Copper plated steel sheet | 1.5 | 11 | | 500 |

According to the treating method of this example, there was a little dependency on the metals to be treated and the steel sheets and plated steel sheets could be satisfactorily colored.

EXAMPLE 3

12% Ni-Zn electroplated steel sheets were treated in the same manner as in Example 2 except that solution A comprising the acidic aqueous solution used in Example 2 and 8000 ppm of commercially available polyaminesulfone polymer and solution B comprising the acidic aqueous solution used in Example 2 and 20 ppm of polyacrylamide were used. As a result, when solution A was used, value L was 11 and when solution B was used, value L was 12 and in both the cases there were obtained black steel sheets having semigloss and excellent in workability.

EXAMPLE 4

Cold-rolled steel sheets were subjected to zinc-nickel alloy plating (Ni 12%) at 20 g/m² in a sulfuric acid bath by known method, then coloring treatment as shown in Table 3, thereafter, chromate treatment and guard coat treatment.

No. 42 is an example where $Ni^{2+}$ was added as $Me^{n+}$ and Nos. 43–47 are examples where the bath contained $Ni^{2+}$ and $Fe^{2+}$ as $Me^{n+}$. In only No. 47, pH was increased to 2.5. In all of these examples, black appearance and practically satisfactory qualities were obtained. Among them, the best adhesion was obtained by the bath containing two kinds of ions jointly added as $Me^{n+}$ and having low pH.

No. 48 is an example of $Me^{n+}$ being $Fe^{2+}$ and Nos. 49 and 50 are examples of using baths containing jointly $Ni^{2+}$ and $Co^{2+}$ and $Fe^{2+}$ and $Cr^{3+}$, respectively. No. 51 is an example of using a bath containing no $Me^{n+}$ and shows that the degree of blackness was insufficient and adhesion was poor. No. 52 is an example of using a bath having a low $Ni^{2+}/Zn^{2+}$ ratio of 0.67 and shows that adhesion was insufficient.

Nos. 53–56 are examples where a kind of $OX^-$ was changed and shows that $NO_3^-$ provided the lowest value L and other oxidizing ions also had the blackening effect.

Nos. 57 and 58 are examples of using baths containing jointly $Fe^{2+}$ and $Sn^{2+}$ or $Cu^{2+}$ and Nos. 59–61 are examples where the amount of $Zn^{2+}$ was changed to examine effect of the ratio $Me^{n+}/Zn^{2+}$ and show that when $Zn^{2+}$ was too low, nonuniform appearance was apt to be formed.

No. 62 is an example of using a bath containing no $Zn^{2+}$ and shows that a high value L resulted and nonuniform appearance was formed due to generation of gas.

TABLE 3

| No. | | Bath composition (g/l) | | Me/Zn | OX⁻ | pH | Bath temp. |
|---|---|---|---|---|---|---|---|
| | | $Zn^{2+}$ | $Me^{n+}$ | | | | |
| 42 | Example of this invention | 45 | $Ni^{2+}$ 66 | 1.47 | NaNO₃ 5 | 1.5 | 40 |
| 43 | " | 45 | $Ni^{2+}$ 45 $Fe^{2+}$ 45 | 2.0 | " | 1.4 | 40 |
| 44 | " | " | " | " | " | " | " |
| 45 | " | " | " | " | " | " | " |
| 46 | " | " | " | " | " | " | " |
| 47 | " | " | " | " | " | 2.5 | " |
| 48 | " | " | $Fe^{2+}$ 90 | " | " | 1.8 | " |
| 49 | " | " | $Ni^{2+}$ 66 $Co^{2+}$ 5 | " | " | 1.8 | " |
| 50 | " | " | $Fe^{2+}$ 90 $Cr^{3+}$ 5 | " | " | 1.8 | " |
| 51 | Comparative Example | 45 | 0 | 0 | " | 1.8 | " |
| 52 | Example of this invention | 45 | $Ni^{2+}$ 30 | 0.67 | NaNO₃ 5 | 1.8 | 40 |
| 53 | " | 45 | $Ni^{2+}$ 45 $Fe^{2+}$ 45 | 2.0 | Zn(NO₃)₂7H₂O 8.5 | 1.4 | " |
| 54 | " | " | " | 2.0 | NaNO₂ 5 | 1.4 | " |
| 55 | " | " | " | " | NaClO₄ 10 | " | " |
| 56 | " | " | " | " | Na₂ClO₃ 10 | " | " |
| 57 | " | " | $Fe^{2+}$ 66 $Sn^{2+}$ 5 | 1.57 | HNO₃ 3.6 | " | " |
| 58 | " | " | $Fe^{2+}$ 66 $Cu^{2+}$ 2 | 1.51 | HNO₃ 3.6 | " | " |
| 59 | " | 20 | $Fe^{2+}$ 45 $Ni^{2+}$ 45 | 4.5 | NaNO₃ 10 | " | " |
| 60 | " | 11 | " | 8.1 | NaNO₃ 10 | " | " |
| 61 | " | 5 | " | 8.0 | NaNO₃ 10 | " | " |
| 62 | Comparative Example | 0 | " | ∞ | NaNO₃ 10 | " | " |

TABLE 3-continued

| | Electrolysis | | | | | Corrosion | |
|---|---|---|---|---|---|---|---|
| | Dk | Q | CW | Value L | Adhesion | resistance | Uniformity |
| | 15 | 50 | 0.9 | 20 | | 300 | |
| | 15 | 10 | 0.15 | 35 | | 300 | " |
| | " | 25 | 0.4 | 18 | | 300 | " |
| | " | 50 | 0.8 | 14 | | 300 | " |
| | " | 200 | 3.0 | 12 | Δ | 300 | " |
| | " | " | 4.5 | 12 | Δ | 300 | " |
| | " | 50 | 1.0 | 20 | | 300 | " |
| | " | 50 | 1.0 | 20 | | 300 | " |
| | " | 50 | 1.0 | 20 | | 300 | " |
| | " | " | 1.0 | 50 | x | — | " |
| | 15 | " | 1.5 | 20 | Δ | — | " |
| | " | 50 | 0.8 | 14 | | 300 | " |
| | " | " | 0.8 | 20 | | 300 | " |
| | " | " | 0.7 | 20 | | 300 | " |
| | " | " | 0.4 | 20 | | 300 | " |
| | " | " | 1.0 | 20 | | 300 | " |
| | " | " | 1.0 | 16 | | 300 | " |
| | " | " | 0.6 | 14 | | 300 | " |
| | " | " | 0.3 | 20 | | " | x |
| | " | " | 0.2 | 25 | | " | " |
| | " | " | 0.1 | 35 | | " | " |

EXAMPLE 5

Electrolysis (20A/dm$^2$ and 50 coulomb/dm$^2$) was effected in an aqueous solution containing 45 g/l of Zn$^{2+}$, 44g/l of Ni$^{2+}$ and 43 g/l of Fe$^{2+}$ (Me$^{n+}$/Zn$^{2+}$=1.93) and 5 g/l of NaNO$_3$ and having a pH of 1.4 using a lead sheet as an anode and various steel sheets and plated steel sheets as shown in Table 4 as cathode, and then the thus treated sheets were subjected to chromate treatment and application of guard coat.

TABLE 4

| No. | | Steel sheet treated | C.W | Value L | Adhesion |
|---|---|---|---|---|---|
| 63 | Example of this invention | Cold-rolled steel sheet | 0.9 | 11 | |
| 64 | " | Stainless steel sheet | 0.9 | 11 | |
| 65 | " | Hot dipped Zn plated steel sheet 20μ | 0.8 | 20 | |
| 66 | " | Hot dipped Al plated steel sheet 10μ | 0.8 | 20 | |
| 67 | " | Zn—Ni alloy electroplated steel sheet (Ni 12%) 3μ | 0.8 | 11 | |
| 68 | " | Zn—Fe alloy electroplated steel sheet (Fe 20%) 3μ | 0.8 | 12 | |
| 69 | " | Tern plated steel sheet | 0.9 | 12 | |
| 70 | " | Copper plated steel sheet | 0.9 | 10 | |

The treatment of this example had a little dependency on the metals to be treated and all of the steel sheets and plated steel sheets could be colored.

EXAMPLE 6

12% Ni-Zn alloy plated steel sheets (20 g/m$^2$) were colored in black using the same acidic aqueous solution and electrolysis conditions as used in Example 5, then were subjected to cathodic electrolytic chromate treatment (3 A/dm$^2$ and 10 coulomb/dm$^2$) in an aqueous chromic acid solution of CrO$_3$/SO$_4$=20/0.15 g/l (bath A) or CrO$_3$/H$_3$PO$_4$=20/0.15 g/l (bath B), then were coated with a commercially available composite coating composition comprising polyethyleneimineacrylic acid emulsion and silica sol at a thickness of 1 μm (as dry film) and baked at 120° C.

The resulting value L was 12 in case of bath A and 11 in case of bath B and adhesion in both cases was such that no peeling was recognized in the test of T Bend (one sheet thickness).

EXAMPLE 7

Cold-rolled steel sheets were subjected to bright and dull finish rolling of 0.6, 1.2 and 2.0 μm in average roughness (Ra), then common pretreatment and 12% Ni-Zn alloy plating (20 g/m$^2$) and the blackening treatment of Example 3, followed by the chromate treatment and guard coat treatment (1.5 μm in film thickness) of Example 1. For the sheets of 1.2 μm in average roughness, thickness of the guard coat was 2, 3 and 5 μm. The results are shown in Table 5.

TABLE 5

| No. | | Average roughness | Guard coat | Value L | Gloss | Adhesion | Spot weldability |
|---|---|---|---|---|---|---|---|
| 71 | Example of this invention | 0.6 | 1.5 | 10 | 50 | | |
| 72 | " | 1.2 | 1.5 | 12 | 25 | | |
| 73 | " | 2.0 | 1.5 | 13 | 19 | | |
| 74 | " | 1.2 | 2 | 11 | 25 | | |
| 75 | " | 1.2 | 3 | 10 | 30 | | Δ |
| 76 | Comparative Example | 1.2 | 5 | 10 | 40 | | x |

TABLE 5-continued

| No. | Average roughness | Guard coat | Value L | Gloss | Adhesion | Spot weldability |
|-----|-------------------|------------|---------|-------|----------|------------------|

Evaluation of Spot Weldability
Weldable Electric Current Range
◎ more than 3 kA
○ 1–3 kA
Δ 0.5–1 kA
× impossible Test Conditions:
Diameter of Welding Electrode: 4.5 mm
Pressure: 125 kg
Cycle: 10 Hz Furthermore, the resulting sheets were subjected to spot welding by conventional method to find that the sheet having the guard coat of 3 μm thick showed poor current flowing and the welding was impossible for the sheet of 5 μm in thickness of the guard coat.

EXAMPLE 8

12% Ni-Zn electroplated steel sheets were subjected to the same treatment as in Example 5 except that solution A comprising the acidic aqueous solution used in Example 5 to which 8000 ppm of commercially available plyaminesulfone was added and solution B comprising the acidic aqueous solution used in Example 5 to which 20 ppm of polyacrylamide was added were used. Black steel sheets superior in adhesion with value L=11 when solution A was used and value L=12 when solution B was used were obtained.

EXAMPLE 9

Electrolysis treatment was conducted in aqueous solution as shown in Table 6 using a lead plate as an anode and the following steel sheets as cathode: cold-rolled steel sheet (called S), zinc electroplated steel sheet (E), Ni(20%)-Zn alloy plated steel sheet (Z) and Fe(20%)-Zn alloy plated steel sheet (FZ). The treated sheets were washed with water and thereafter, if necessary, subjected to chemical treatment and coating with organic polymer film. The quality of these sheets was evaluated.

No. 77 which is outside the scope of this invention is an example of a black film obtained using a bath containing $Zn^{2+}$ alone to which components C and D were added and when a guard coat was applied, a uniform appearance with a low value L (12) was obtained, but when the guard coat was not applied, value L increased. No. 78 which is outside the scope of this invention is an example where component D was not added and adhesion was not sufficient. Nos. 79–86 are examples of this invention where the bath contained both $Zn^{2+}$ and $Ni^{2+}$ with components C and D changed in concentration and, also, besides, Dk was changed. In all of these examples black surface treated steel sheets of good quality were obtained. Nos. 87 and 88 are examples where the pH of the bath was 1.5. Nos. 89 and 90 are examples where cold-rolled steel sheets were subjected to the blackening treatment. In No. 90, adhesion was poor when the amount of deposition was 5.5. Nos. 91–93 are examples where zinc electroplated steel sheets were subjected to the blackening treatment and good results were obtained in all of them. As is seen in No. 93, a black film of value L=13 was obtained with 12 coulomb/dm² and the quantity of current necessary for blackening was small. No. 94 is an example where an iron-zinc alloy plated steel sheet was subjected to the blackening treatment.

EXAMPLE 10

12% Ni-Zn alloy plated steel sheets were subjected to electrolysis treatment in the same manner as in Example 9 in aqueous solutions as shown in Table 7 and the treated steel sheets were applied with guard coat, if necessary, and evaluation was effected on the quality.

No. 95 is an example of this invention where a bath containing both $Zn^{2+}$ and $Ni^{2+}$ and also F ($NaNO_3$) and H ($Na_5P_3O_{10}$) was used. No. 96 is an example where a bath containing $Zn^{2+}$ and $Fe^{2+}$ together with F and H was used, and No. 97 is an example where a bath containing $Co^{2+}$ in addition to $Zn^{2+}$ and $Ni^{2+}$ was used. No. 98 is an example where $Co^{2+}$ was replaced with $Cr^{3+}$ in No. 97. The products of Nos. 95–98 had all black surface treated films of good quality. No. 99 is an example where $NaNO_3$ and $KClO_4$ were used in combination as an oxidizing ion, No. 100 is an example where $Na_8P_6O_{19}$ was used as condensed phosphoric acid and No. 101 is an example where both $Ni^{2+}$ and $Fe^{2+}$ were present in the bath and in these examples, products of good quality were obtained. No. 102 is an example where the pH of the bath was increased and the resultant product was inferior in adhesion and uniformity, while the product of No. 103 where the pH was lowered was good in these properties. No. 104 is an example where Dk was 70 A/dm² and the appearance showed unevenness. Nos. 105–107 are examples where $Ni^{2+}/Zn^{2+}$ ratio was changed to 0.33–2.0 and the product of No. 105 was somewhat inferior in uniformity of appearance.

EXAMPLE 11

The surface of cold-rolled sheets was electroplated with zinc (20 g/m²) from sulfuric acid solution, then subjected to cathodic electrolysis treatment in the following bath A or bath B to form black film, thereafter chemical treatment as in Example 9 and then coating with the composite resin comprising organic compound and silica of Example 9 at coverages of 1, 3 and 5 g/m² and then baking treatment to obtain black surface treated steel sheets.

Bath A: $ZnSO_4 \cdot 7H_2O/NiSO_4 \cdot 7H_2O/NaNO_3 = 200/100/5$ g/l, pH=1.8
Bath B: Bath A + $Na_5P_3O_{10}$ 10 g/l, pH=1.8
Electrolytic conditions: 10 A/dm², 50 coulomb/dm²
Chemical treatment: Total deposition amount of chromium 20 mg/m²

When bath A was used, value L was 19–25 after application of guard coat and the products were finished in somewhat white color while when bath B was used, value L was 12–15 and semigloss appearance was obtained. The coating of the composite resin greatly affected the spot weldability. When it was coated at 5 g/m², welding was impossible. When it was 1 g/m², continuous spot welding was possible. When 3 g/m², failure occurred at the rate of 20%.

TABLE 6

| No. | Materials treated | Aqueous solution (g/l) A | B | C | D | pH | Bath temp. | Dk | Q | B-CW |
|---|---|---|---|---|---|---|---|---|---|---|
| 77 | NZ | 200 | 0 | 10 | 5 | 2 | 40 | 20 | 50 | 2.0 |
| 78 | " | 200 | 100 | 5 | 0 | 2 | " | " | " | 2.2 |
| 79 | " | " | " | 2 | 5 | " | " | " | " | 1.9 |
| 80 | " | " | " | " | " | " | " | 10 | " | 1.9 |
| 81 | " | " | " | 3 | " | " | " | 10 | " | 1.9 |
| 82 | " | " | " | 4 | " | " | " | " | " | 2.5 |
| 83 | " | " | " | " | 7 | " | " | 10 | 50 | 1.9 |
| 84 | " | " | " | " | " | " | " | 15 | 50 | 1.9 |
| 85 | " | " | " | " | " | " | " | 20 | 50 | 2.7 |
| 86 | " | " | " | 5 | 10 | 1.9 | " | 10 | 50 | 2.0 |
| 87 | " | " | " | 10 | 17 | 1.5 | " | 10 | 50 | 1.9 |
| 88 | " | " | " | " | " | " | " | 20 | 50 | 1.9 |
| 89 | S | " | " | " | " | " | " | 10 | 50 | 2.6 |
| 90 | " | " | " | " | " | " | " | " | 100 | 5.5 |
| 91 | E | " | " | " | " | " | " | " | 50 | 2.2 |
| 92 | E | " | " | " | " | " | " | " | 25 | 0.9 |
| 93 | " | " | " | " | " | " | " | " | 12 | 0.3 |
| 94 | FZ | " | " | " | " | " | " | 10 | 50 | 2.0 |

| Guard coat Chemical | Coat | Value L | Adhesion | Uniformity |
|---|---|---|---|---|
| Present | Present | 25 | 0 | |
| Present | Present | 19 | 30 | |
| " | " | 19 | 0 | |
| " | " | 19 | 0 | |
| " | " | 16 | 0 | |
| " | " | 17 | 0 | |
| " | " | 12 | 0 | |
| " | " | " | 0 | |
| " | " | " | 0 | |
| " | " | 12 | 0 | |
| " | " | " | 0 | |
| " | " | " | 0 | |
| " | " | " | 0 | Δ - |
| " | " | " | 0 | |
| " | " | " | 0 | |
| " | " | 13 | 0 | |
| " | " | 12 | 0 | |

A: $ZnSO_4 \cdot 7H_2O$
B: $NiSO_4 \cdot 7H_2O$
C: $NaNO_3$
D: $Na_5P_3O_{10}$
Dk: current density $A/dm^2$
Q: Quantity of current coulomb/$dm^2$
B-CW: Deposition amount of black film g/$m^2$
Uniformity
Evaluation of appearance after blackening treatment
  Uniform and beautiful
Δ Somewhat ununiform
× nonuniform
Chemical: $CrO_3/SiO_2$ Total deposition amount 20 mg/$m^2$ as total chromium
Coat: Composite film of commercially available polyolefin acrylic emulsion and colloidal silica (1 g/$m^2$)
Value L: Brightness (JIS Z 8370) L ≦ 20 is necessary for black
Adhesion: Erichsen 10 mm drawn and peeling by cellotape. Area of peeling is expressed by %.

TABLE 7

| | Composition of aqueous solution (g/l) A | B | C | D | E | F | G | H | I | pH | Bath temp. | Dk | Q | B-CW |
|---|---|---|---|---|---|---|---|---|---|---|---|---|---|---|
| 95 | 200 | 200 | — | — | — | 10 | — | 17 | — | 2 | 40 | 10 | 50 | 2.0 |
| 96 | " | — | 200 | — | — | " | — | " | — | " | " | " | " | 2.1 |
| 97 | " | 200 | — | 20 | — | " | — | " | — | " | " | " | " | 1.9 |
| 98 | " | 200 | — | — | 20 | " | — | " | — | " | " | " | " | 1.8 |
| 99 | " | 200 | — | — | — | 10 | 5 | " | — | " | " | " | " | 2.0 |
| 100 | " | " | — | — | — | 10 | — | — | 16 | 1.8 | " | " | " | 1.9 |
| 101 | " | 50 | 50 | — | — | 5 | — | 10 | — | 1.8 | " | " | " | 1.9 |
| 102 | " | 100 | — | — | — | 5 | — | 7 | — | 3.5 | " | " | " | 2.5 |
| 103 | " | " | — | — | — | " | — | " | — | 1.8 | " | 50 | " | 2.0 |
| 104 | " | " | — | — | — | " | — | " | — | " | " | 70 | " | 2.5 |
| 105 | 50 | 100 | — | — | — | 5 | — | 10 | — | 1.8 | 40 | 10 | 50 | 2.0 |
| 106 | 100 | " | — | — | — | 5 | — | 10 | — | " | " | " | " | 1.9 |
| 107 | 300 | " | — | — | — | 5 | — | 10 | — | " | " | " | " | 2.0 |

| Guard coat Chemical | Coat | Value L | Adhesion | Uniformity |
|---|---|---|---|---|
| Present | Present | 12 | | |
| " | " | 12 | | |
| " | " | 13 | | |

TABLE 7-continued

| | | |  |  |
|---|---|---|---|---|
| " | " | 15 | | |
| " | " | 12 | | |
| " | " | 13 | | |
| " | " | 15 | | |
| " | " | 19 | Δ~ | Δ |
| " | " | 12 | | |
| " | " | 19 | | Δ~ |
| " | " | 17 | | Δ~ |
| " | " | 12 | | |
| " | " | 22 | | |

A: $ZnSO_4 \cdot 7H_2O$
B: $NiSO_4 \cdot 7H_2O$
C: $FeSO_4 \cdot 6H_2O$
D: $CoSO_4 \cdot 6H_2O$
E: $Cr_2(SO_4)_3$
F: $NaNO_3$
G: $KClO_4$
H: Sodium tripolyphosphate ($Na_5P_3O_{10}$)
I: Sodium hexametaphosphate ($Na_8P_6O_{19}$)

EXAMPLE 12

On a 12% Ni-Zn alloy plated steel sheet was formed a black zinc composite plating film by electroysis in an aqueous sulfate solution of $Zn^{2+}/Ni^{2+}/NaNO_3=45/55/5$ g/l of pH=2.3 to which was added $Cr^{3+}$ in an amount of 0.1 g/l (bath A), 0.5 g/l (bath B) or 1.0 g/l (bath C) at a bath temperature of 40° C., a current density of +A/dm² and current quantity of 40 coulomb/dm² and then a coating type chromate solution composed of silica sol and chromic acid was coated thereon at a total Cr coverage of 30-40 mg/m², followed by drying. Thereafter, thereon was coated a clear resin containing silica by roll coating at a thickness of 1.5 μm and this was baked at 120° C. Value L was 12 in case of bath A, 13 in case of bath B and 16 in case of bath C. With reference to adhesion, there was recognized no peeling when the samples were subjected to Erichsen test of 10 mm deep drawing. Corrosion resistance according to salt spray exposure test was 300 hours in case of bath A and 500 hours in case of baths B and C with occurrence of no white rusts.

EXAMPLE 13

Electrolysis was effected in an aqueous sulfuric acid solution of $Zn^{2+}/Ni^{2+}/NaNO_3=45/55/5$ g/l and pH=2.3 using a Ni-Zn alloy plated steel sheet as a cathode at a bath temperature of 40° C., a current density of 20 A/dm² and a current quantity of 50 coulomb/dm². Then, the sample was dipped in a 1% aqueous condensed phosphoric acid solution for 2 seconds, then washed with water, subjected to a coating type chromate treatment (total Cr coverage 30 mg/m², then coated with a clear resin containing silica at a thickness of 1.5 μm and baked at a sheet temperature of 100° C. The thus obtained colored zinc composite plated steel sheet had a black appearance of value L=12, showed no peeling in Erichsen test of 10 mm drawing, had a corrosion resistance of 300 hours according to salt spray exposure test and had no white rusts.

The color surface treated steel sheet according to this invention is superior in appearance, workability and corrosion resistance and also has a high resistance to scuffing. This steel sheet can be used in the field of conventional coated steel sheets as a new steel sheet and contributes to production of articles of high quality and low cost.

Further, treating conditions of very wide ranges can be applied and treatment of high speed and short time is possible. Thus, treatment in the conventional electroplating line is possible with low cost.

Especially, this invention has no dependency on the substrate metals for coloration and can easily color the surface through which current is passed. In this respect, this invention is advantageous over the conventional alloy plating method or the method of dissolving and alloy.

What is claimed is:

1. A method for making a colored zinc composite plated steel which comprises effecting the electrolysis in an acidic aqueous solution mainly composed of $Zn^{2+}$, coloring metal ion $Me^{n+}$ and strongly oxidizing ion $OX^-$ using steel sheet or said plated steel sheet as a cathode, said ion being at least one selected from the group consisting of $NO_3^-$, $NO_2^-$, $ClO_4^-$ and $ClO_{3-}$ to deposit a colored composite-plating film mainly composed of metallic zinc or a zinc alloy and coloring metal oxide or hydrated oxide on said sheet at a coverage of 0.-5 g/m² and then applying a transparent top coat of 3 μm or less thick onto said film.

2. A method according to claim 1 including subjecting colored composite-plating film formed to chemical treatment and then applying with the top coat.

3. A method according to claim 1 wherein the coloring metal ion $Me^{n+}$ is at least one ion selected from the group consisting of $Ni^{2+}$, $Co^{2+}$, $Fe^{2+}$, $Fe^{3+}$, $Cr^{3+}$, $Sn^{2+}$ and $Cu^{2+}$.

4. A method according to claim 1 wherein said solution contains at least one ion selected from the group consisting of $PO_2O_5^{4'''}$, $P_3O_{10}^{5-}$, $P_4O_{13}^{6-}$ and $P_6O_{19}^{8-}$ is used.

5. A method according to claim 1 wherein the acidic aqueous solution has a pH of 1-4.

6. A method according to claim 1 wherein concentration of $Zn^{2+}$ is 10-100 g/l, that of the coloring metal ion is 10-100 g/l and that of the strongly oxidizing ion is 1-50 g/l.

7. A method according to claim 1 wherein concentration of $Zn^{2+}$ is 20-50 g/l, that of the coloring metal ion is 20-70 g/l and that of the strongly oxidizing ion is 1-20 g/l.

8. A method according to claim 1 wherein concentration of $Zn^{2+}$ is 10-100 g/l, that of the coloring metal ion is 10-100 g/l and that of the strongly oxidizing ion is 1-50 g/l and that of $Cr^{3+}$ is 0.1-10 g/l.

9. A method according to claim 1 wherein the acidic aqueous solution has a ratio $Me^{n+}/Zn^{2+}$ of 0.1-1.0.

10. A method according to claim 1 wherein the acidic aqueous solution has a ratio $Me^{n+}/Zn^{2+}$ of 1 or more.

11. A method according to claim 1 wherein the acidic aqueous solution has a ratio $Me^{n+}/Zn^{2+}$ of 1.5-3.0.

12. A method according to claim 1 wherein the electrolysis is effected at a current density of 10–100 $A/dm^2$ and a current quantity of 20-200 $coulomb/dm^2$.

13. A method according to claim 1 wherein the electrolysis is effected at a current density of 5–50 $A/dm^2$ and a current quantity of 5-100 $coulomb/dm^2$.

14. A method according to claim 1 wherein the electrolysis is effected at a current density of 5–100 $A/dm^2$ and a current quantity of 20-200 $coulomb/dm^2$.

15. A method according to claim 1 wherein temperature of the acidic aqueous solution is 20°-60° C.

16. A method according to claim 1 including forming the colored zinc composite-plating film at 0.1-5 $g/m^2$, then treating with an aqueous solution of a phosphoric acid compound and then subjecting to chromate treatment and top guard coating of 3 $\mu$m or less thick.

* * * * *